Patented Dec. 2, 1930

1,783,684

UNITED STATES PATENT OFFICE

FOORD von BICHOWSKY, OF GLENDALE, CALIFORNIA, ASSIGNOR TO TITANIA CORPORATION, OF LOS ANGELES, CALIFORNIA, A CORPORATION OF CALIFORNIA

TITANIUM ACID SULPHATE AND METHOD OF PRODUCING SAME

No Drawing. Application filed November 20, 1928. Serial No. 320,762.

The present invention relates to titanium acid sulphate and a method of producing the same. In my copending United States application, Serial No. 199,135, filed June 15th, 1927, Patent No. 1,742,674, dated January 7, 1930, there is described a method for producing titanium oxide from titanium nitride through the employment of nitric acid either alone or in combination. I have now discovered in carrying out this reaction, that under certain conditions, new compositions of matter, having novel and valuable properties are formed.

As an example of the preparation of one of these novel compositions of matter, I give a description of the following experiment: One pours 300 grams of concentrated sulphuric acid into 163 cubic centimeters of water and when the mixture has cooled to about 80° C., there is added with stirring 80 grams of finely ground titanium nitride or cyanonitride and then, when the reactive nitrogen compound is all in suspension, one adds, very slowly and in quantities of 2.5 cc. at a time, concentrated nitric acid.

A violent reaction soon results and the temperature of the pasty mixture rises very rapidly. Care should therefore be taken that the temperature of the mass does not exceed 100° C., otherwise some nitric acid may distill off and be lost. After about 50 cc. of the nitric acid have been added, which will ordinarily take 4 to 6 hours, the reaction ceases, or at most only a few bubbles of nitrogen are given off. At this stage the mixture is warmed on the water bath over night and in the morning the contents of the reaction vessel are somewhat diluted with water and then filtered on a suction filter. The residue on the filter consists of titanium oxide mixed with graphite and silica, and traces of unattacked nitride. On large scale production, this material can be roasted to form a cheap pigment or filler. The filtrate which is of a yellowish to greenish color is first evaporated on the water bath and then in a vacuum pan under an absolute pressure of about 5 cms. of mercury. The evaporation under vacuum is discontinued when the temperature goes to above 130° C. There is thus obtained a very thick liquid that cools to a glassy semi-solid twice as heavy as water. This solid upon exposure to the air rapidly absorbs moisture, becoming in time a thin clear liquid. An analysis of the glassy like very viscous material showed that it corresponded to the formula:

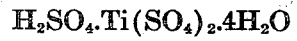
$H_2SO_4 \cdot Ti(SO_4)_2 \cdot 4H_2O$

|  | for there was found upon analysis |  | Theory requires |
|---|---|---|---|
| $TiO_2$ | 19.6% | $TiO_2$ | 19.5% |
| $SO_3$ | 58.5% | $SO_3$ | 58.5% |

The formation of the new substance may be expressed thus:

$$5Ti_2N_2 + 8HNO_3 + 3H_2SO_4 + 16H_2O = 10H_2SO_4 \cdot Ti(SO_4)_2 \cdot 4H_2O + 9N_2$$

This glassy-like material is therefore a new compound of titanium corresponding closely to the known zirconium acid sulphate $H_2SO_4 \cdot Zr(SO_4)_2 \cdot 3H_2O$ and may therefore by analogy be called titanium acid sulphate.

This titanium acid sulphate dissolves in water, faintly acidified with sulphuric acid, in all proportions and without undergoing hydrolysis. In fact these solutions can be heated to nearly 90° C., before becoming cloudy. The acid sulphate is also readily soluble in absolute methyl alcohol.

When a clear solution of my titanium acid sulphate in water was added to a cool saturated solution of potassium sulphate, a dense white precipitate resulted. This precipitate, when washed with cold water and then with absolute alcohol and ether and dried, formed a brilliant white powder corresponding to the formula

$4K_2SO_4 \cdot 5TiOSO_4 \cdot 2TiO_2$

|  | Found | Theory requires |
|---|---|---|
| $TiO_2$ | 33.7% | 33.8% |
| $SO_3$ | 43.8 | 43.5 |
| $K_2O$ | 22.5 | 22.7 |

If, however, the precipitate was allowed to remain in the mother liquor and this liquid was warmed, the precipitate readily dissolved forming a clear solution from which the precipitate again separated on cooling.

When, however, this clear warm solution was further heated, it soon became cloudy due to the titanium compound, therein dissolved, undergoing hydrolysis.

This test differentiates the acid sulphate from the normal sulphate for that, according to Roscoe and Schorlemmer (Treatise on Chemistry, Vol. 2, part 2, page 263, edition 1892), gives crystals of the salt $$K_2SO_4 + Ti(SO_4)_2 + 3H_2O$$

when mixed solutions of the normal sulphate and of potassium sulphate are allowed to evaporate over sulphuric acid.

Instead of employing nitric acid, one can use mixed acid or one can use nitrates that will liberate nitric acid in situ or one can use the nitrogen oxides, that result from the oxidization of ammonia, in combination with sulphuric acid for attacking the titanium nitrogen compounds and forming acid titanium sulphates of varying composition.

When using sodium nitrate, for example, in place of nitric acid, one obtains sodium acid sulphate of titanium thus:—

$$5Ti_2N_2 + 8NaNO_3 + 30H_2SO_4 \text{(dilute)} = 10NaHSO_4.Ti(SO_4)_2.yH_2O + 9N_2$$

where $y$ is equivalent to about 18.

The reaction proceeds with rapidity and with the evolution of heat.

The sodium acid sulphate obtained is a brownish colored transparent very viscous material. Specific gravity about 2.05. The dark color may well be due to traces of iron. The compound is hydroscopic and is somewhat soluble in absolute methyl alcohol undergoing partial dehydration.

When the $NaHSO_4.Ti(SO_4)_2.18H_2O$ is diluted somewhat with water, there gradually separates out upon standing the white and less highly hydrated compound, in the form of small hydroscopic needles which redissolve if the mother liquor be warmed. The new compound has the formula:—

$$NaHSO_4.Ti(SO_4)_2.xH_2O$$

where $x$ is equivalent to approximately 9.

In like manner the various other alkali metal acid sulphates may be formed. The potassium salt is nearly colorless and less soluble and more easily hydrolized than the sodium salt.

If my acid sulphate of titanium be added to neutral distilled water so as to form dilute solutions, partial hydrolysis of the acid sulphate takes place even at ordinary temperatures. If one adds a little of a clear aqueous solution of the acid sulphate to ordinary potable water, a flocculent precipitate is at once formed due to the interaction of the sulphate with the dissolved calcium salts and, or, the alkali metal carbonates present in such waters. From this experiment, it is evident that the acid sulphates of titanium can replace aluminium sulphate as a reagent for the treatment of water and sewage and as a mordant. It may also be used, because of the opacity of titanium compounds, to advantageously replace alum in the manufacture of paper and in other industries. In the chemical laboratory, it can, because of its hydroscopic nature, be employed as a drying agent for gases or as a dehydrating agent. These titanium sulphates may also be reduced either electrically or otherwise to form new and valuable titanous compounds.

I do not limit my claims to the examples given nor to the temperatures, pressures, proportions and times as given, for one can vary these and still be within the scope of my claims.

I claim:

1. As a new composition of matter, the acid sulphates of quadrivalent titanium.

2. As new compositions of matter, the acid sulphates of quadrivalent titanium containing an alkali metal in their composition.

3. As new compounds, the acid sulphates of titanium corresponding to the general formula $R:HSO_4.Ti(SO_4)_2.nH_2O$ where R is any metal of the alkali group of metals including hydrogen and where $n$ is any number including zero.

4. As a new composition of matter, acid sulphate of titanium corresponding to the formula $H_2SO_4.Ti(SO_4)_2.4H_2O$ and being a clear very viscous material having a specific gravity of about 2 and soluble in all proportions in water, containing a little free sulphuric acid, and also soluble in absolute methyl alcohol.

5. As a new composition of matter, the sodium acid sulphate of titanium corresponding to the formula $NaHSO_4.Ti(SO_4)_2$. approximately $18H_2O$ being a dense viscous material soluble in water and somewhat soluble in absolute methyl alcohol.

6. As a new composition of matter, the sodium acid sulphate of titanium corresponding to the formula $NaHSO_4.Ti(SO_4)_2$. approximately $9H_2O$ being a white very hydroscopic crystalline compound.

FOORD von BICHOWSKY.